Patented Aug. 18, 1931

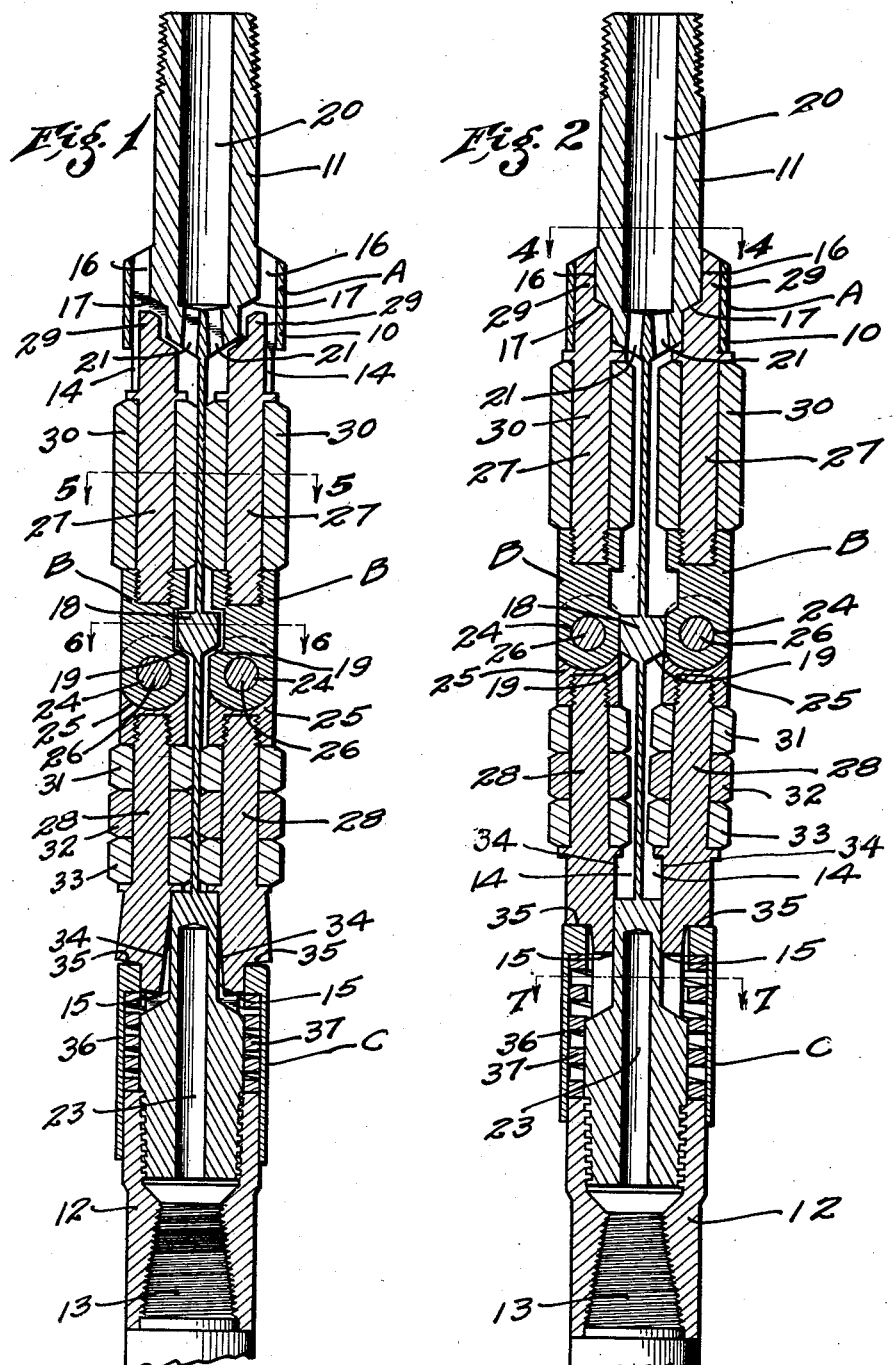

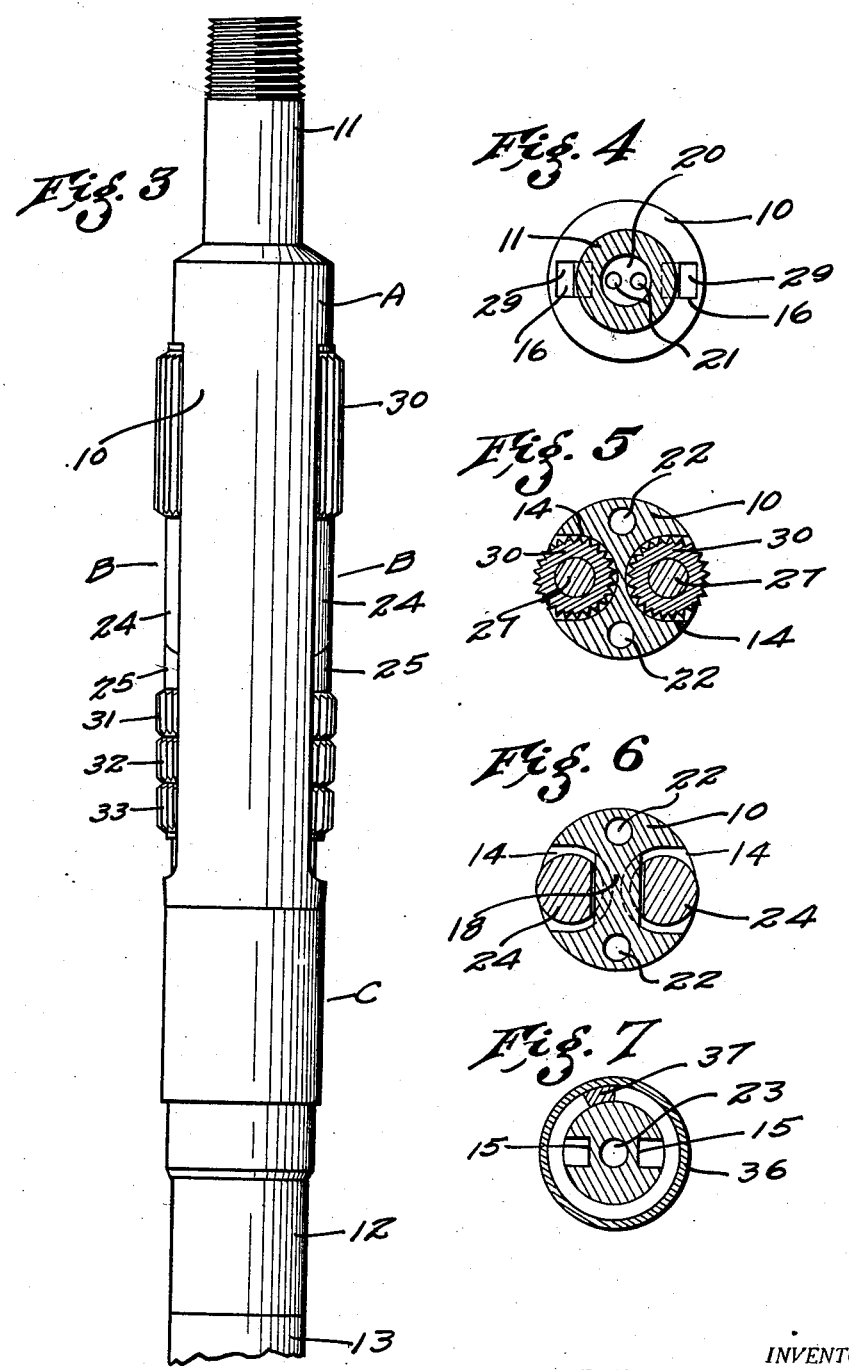

1,819,358

UNITED STATES PATENT OFFICE

ROLAND R. CRUM, OF WHITTIER, CALIFORNIA, ASSIGNOR, BY MESNE ASSIGNMENTS, TO JOHN GRANT, OF LOS ANGELES, CALIFORNIA

UNDERREAMER

Application filed April 3, 1928. Serial No. 266,926.

This invention relates to an underreamer for enlarging holes especially oil well holes. It is desirable to have tools of this character provided with cutters which may be projected and retracted, and, when projected, to have a positive bearing against the cutter body. The present invention pertains to such an underreamer.

The objects of this invention are first, to provide an underreamer having a cutter device articulated immediate the ends so that it may be buckled from collapsed to expanded position; second, to provide means for directing the cutter device into collapsed position as it is buckeled; third, to provide such an underreamer with means tending to buckle the cutter device; fourth, to provide means for holding the ends of the cutter device to the body and cutter bearing surfaces for supporting such ends against the body; fifth, to provide an underreamer having the above mentioned characteristics and rotative cutters; and sixth, to provide details of structure contributing to durability, compactness, and long life. Other objects and corresponding advantages of my invention will be hereinafter pointed out.

Fig. 1 of the drawings is an axial section through an underreamer embodying my invention with the cutter devices being in collapsed position; Fig. 2 is a view similar to Fig. 1 showing the cutter devices in expanded position; Fig. 3 is an elevation of the underreamer; Fig. 4 is a section as seen on the line 4—4 of Fig. 2, Figs. 5 and 6 are sections as seen on the lines correspondingly numbered in Fig. 1; and Fig. 7 is a section as seen on the line 7—7 of Fig. 2.

Referring with more particularity to the drawings, an underreamer is shown which is separate and independent of the ordinary drill and may be connected to the drill string. Referring more particularly to Figs. 1, 2 and 3, the underreamer comprises a body A having mounted thereon cutter devices B. An actuating machine for the cutter devices is indicated generally by C.

The body includes a cutter carrying portion 10 and at the upper end a shank 11 with a threaded pin end for attachment to the drill string. The lower end of the cutter carrying portion 10 is externally threaded to receive a sub 12 forming a box 13 to receive the pin end of any suitable tool or extension of the drill string, such as an ordinary drill or bit. The cutter carrying portion is provided with cavities 14 extending lengthwise of the body. There are two such cavities shown disposed diametrically opposite to one another. However, it will be understood that any number of cutter devices and cavities may be used as found expedient. At the lower end of the portion 10 and within the cavities, are bearing surfaces 15 for supporting the lower ends of the cutter spindles. At the upper ends of the cavities are spindle receiving recesses 16 and adjacent thereto are inclined guide surfaces 17. On the body and intermediate the ends of the cavities is an expander enlargement 18 having inclined lower surfaces 19. A circulation passage 20 has water courses 21 opening to the cavities at the upper ends and branches 22 extending through the body and communicating with lower passage 23.

In each cavity is a longitudinally movable cutter device comprising an articulated spindle. The spindle comprises joints 24 and 25 each pivotally secured together by a pivot pin 26 to form a hinge. As shown herein, each of the joints has a socket into which are threaded journals 27 and 28. Each journal 27 has a retaining flange and is extended and reduced to form fingers 29. These fingers are adapted to fit into the recesses 16. Inclined surfaces are formed upon the ends of the journal members 27 adjacent the guide surfaces 17 to co-operate therewith. Rotatably mounted upon the journals 27 are roller cutters 30. In the structure shown there is a single roller cutter upon each journal 27. However, it will be understood that a plurality of rollers may be mounted thereon as shown upon the lower journal 28. There are three rollers shown mounted upon each journal 28 and it will be obvious that it is within the scope of the invention to use one or more upon this section. A flange for retaining the rollers is provided on each journal 28 and below the flange is an extension having surfaces 34 for support upon the bearing surfaces 15. Shoulders 35 are provided upon the extensions to receive the end flange of a sleeve 36. The sleeve is slidably mounted over the sub 12 so that it may be moved longitudinally upon the body. Mounted about the body and between the flange on the sleeve and the ledge formed by the sub 12 is a compression spring 37 tending to move the sleeve upwardly.

In collapsed position the parts are as shown in Fig. 1. The cutter spindles are in their lower position on the body and the resiliently actuated sleeve is in its lower position with the compression spring compressed. The knuckles of the spindle are below the expander 18 and in their inner position. The fingers 29 are without the recesses 16 with the inclined surfaces on the spindles engaging the guide surfaces. With the tool in this condition it may be placed within a casing or any other member to hold it against expansion. Assuming that it is held by an oil well casing in this position, the tool is lowered until it passes below the end of the casing or the shoe. Thereupon, the sleeve is moved upwardly by the compression spring 37 causing the spindles to be moved longitudinally and the knuckles to ride over the expander into the position shown in Fig. 2. The upper ends of the spindle are caused to ride over the guide surfaces and into the recesses. Buckling and expansion has thus occurred. To collapse the cutter it is drawn upwardly until the rollers 30 engage the shoe, the bevelled upper corners causing the cutter devices to be moved downwardly and into collapsed position.

The general reamer structure shown in this application is similar to that of my copending application Serial No. 266,553 filed April 2nd, 1928. Insofar as the general reamer structure is patentable to me, said copending application carries the claims thereto; this present application being restricted to the improvement which relates particularly to the articulated cutters.

What I claim is:—

1. An underreamer of the character described comprising a body, cutter devices mounted on said body, said devices extending lengthwise of said body and being articulated intermediate the ends so as to be capable of being buckled outwardly into cutter expanded position, the ends of said devices being retained on said body against lateral displacement therefrom, and actuating spring means on said body tending to compress said devices longitudinally and buckle the latter.

2. An underreamer of the character described comprising a body having cutter accommodating cavities with cutter supporting surfaces at the end, cutter devices disposed in said cavities extending lengthwise of the body and bearing at the ends on said surfaces, said devices being hinged intermediate the ends so as to be buckled outwardly into cutter expanded position and inwardly into cutter collapsed position, and spring means on said body tending to compress said devices longitudinally and buckle the latter.

3. An underreamer of the character described comprising a body having cutter accommodating cavities with cutter supporting surfaces at the end, cutter devices in said cavities and longitudinally movable on the body and bearing at the ends on said surfaces, said devices being hinged intermediate the ends so as to be buckled outwardly into cutter expanded position and inwardly into cutter collapsed position, expander means on said body between said devices at the hinged joints including inclined surfaces upon which the joints ride and are supported whereby to cause outward buckling of said devices upon longitudinal movement thereof, and actuating means on said body tending to compress and move said devices longitudinally and buckle the latter.

4. An underreamer of the character described comprising a body having cutter accommodating cavities with lateral cutter bearing surfaces at the lower ends for cutter spindles, cutter supporting recesses at the upper ends of said cavities for receiving and laterally maintaining the upper cutter spindle ends in expanded position, inclined guide surfaces for directing the cutter spindles from cutter collapsed position into said recesses, cutter spindles disposed in said cavities for longitudinal movement with the lower ends bearing against said bearing surfaces, the upper ends of said spindles having inclined surfaces corresponding to said guide surfaces and engaged therewith, said cutter spindles being hinged intermediate the ends, said body having expander means at the hinged joints of said spindles including inclined surfaces upon which the joints ride whereby to cause outward buckling of said spindle, cutters on said spindles and actuating means tending to compress and move said spindles longitudinally and buckle the latter.

5. An underreamer of the character described comprising a body having cutter accommodating cavities with lateral cutter bearing surfaces at the lower ends for cutter spindles, cutter supporting recesses at the upper ends of said cavities for receiving and laterally maintaining the upper cutter spindle ends in expanded position, inclined guide surfaces for directing the cutter spindles from cutter collapsed position into said recesses, cutter spindles disposed in said cavities for longitudinal movement with the lower ends bearing against said bearing surfaces, the upper ends of said spindles having inclined surfaces corresponding to said guide surfaces and engaged therewith, said cutter spindles being hinged intermediate the ends, said body having expander means at the hinged joints of said spindle including an inclined surface upon which the joints ride whereby to cause outward buckling of said spindles, cutters on said spindles, a resiliently operated actuating sleeve on said body bearing against said spindles and tending to compress and move said spindles longitudinally and buckle the latter.

6. An underreamer of the character described comprising a body having cutter accommodating cavities with lateral cutter bearing surfaces at the lower ends for cutter spindles, cutter supporting recesses at the upper ends of said cavities for receiving and laterally maintaining the upper cutter spindle ends in expanded position, inclined guide surfaces for directing the cutter spindles from cutter collapsed position into said recesses, cutter spindles disposed in said cavities for longitudinal movement with the lower ends bearing against said bearing surfaces, the upper ends of said spindles having inclined surfaces corresponding to said guide surfaces and engaged therewith, said cutter spindles being hinged intermediate the ends, said body having expander means at the hinged joints of said spindles including an inclined surface upon which the joints ride whereby to cause outward buckling of said spindles, cutters on said spindles, an actuating sleeve having an upstanding marginal abutment defining a pocket to receive the lower ends of said spindles and maintain the latter against lateral displacement, said sleeve being mounted for longitudinal sliding movement on said body, and a compression spring embracing said body and bearing against sleeve tending to compress and move said spindles longitudinally and buckle the latter.

7. An underreamer of the character described comprising a body, movable cutter carrying spindles mounted on said body, cutters on the spindles, said spindles extending lengthwise of said body and being articulated intermediate the ends so as to be capable of being buckled outwardly into cutter expanded position and inwardly into cutter collapsed position, the ends of said spindles being retained on said body against lateral displacement therefrom, expanding means on said body at and between the articulations and in relation to which the spindles are movable whereby to cause said cutter spindles to be buckled outwardly and supported in outwardly buckled position, and rotative cutters mounted on said spindles.

8. An underreamer of the character described comprising a body, cutter spindles longitudinally slidable on said body and being articulated intermediate the ends so as to be capable of being buckled outwardly into cutter expanded position and inwardly into cutter collapsed position, the ends of said spindles being retained on said body against lateral displacement therefrom, expanding means on said body at the articulations including an inclined surface upon which said articulations ride and are supported whereby upon longitudinal movement of said spindles in one direction said spindles will be caused to be buckled outwardly into and supported in cutter expanded position, and rotative cutters mounted on said spindles.

9. An underreamer of the character described comprising a body, movable cutter carrying spindles mounted on said body, cutters on the spindles, said spindles extending lengthwise thereof and being articulated intermediate the ends so as to be capable of being buckled outwardly into cutter expanded position and inwardly into cutter collapsed position, the ends of said spindles being retained on said body against lateral displacement therefrom, expanding means on said body at and between the articulations and in relation to which the spindles are movable whereby to cause said spindles to be buckled outwardly and supported in outwardly buckled position, actuating means on said body tending to compress said spindles longitudinally and buckle the latter, and rotative cutters mounted on said spindles.

10. An underreamer of the character described comprising a body having cutter accommodating cavities with cutter supporting surfaces at the ends, movable cutter carrying spindles in said cavities extending lengthwise of the body and bearing at the ends on said surfaces, cutters on the spindles, said spindles being hinged intermediate the ends so as to be buckled outwardly into cutter expanded position and inwardly into cutter collapsed position, expander means on said body at and between the hinged joints of said spindles and in relation to which the spindles are movable so as to cause said spindles to be buckled outwardly and supported in outwardly buckled position, and rotative cutters mounted on said spindles.

11. An underreamer of the character described comprising a body having cutter accommodating cavities with cutter supporting surfaces at the ends, cutter carrying spindles in said cavities extending lengthwise and longitudinally movable on the body and bearing at the ends on said surfaces, said spindles being hinged intermediate the ends so as to be buckled outwardly into cutter expanded position and inwardly into cutter collapsed position, expander means on said body between said spindles at the hinged joints thereof including an inclined surface upon which the joints ride and are supported whereby to cause outward buckling and support of said spindles upon longitudinal movement thereof, actuating spring means on said body tending to compress and move said spindles longitudinally and buckle the latter, and rotative cutters mounted on said spindles.

12. An underreamer of the character described comprising a body having cutter accommodating cavities with lateral cutter bearing surfaces at the lower ends for cutter spindles, cutter supporting recesses at the upper ends of said cavities for receiving and laterally maintaining the upper cutter spindle ends in expanded position, inclined guide surfaces for directing the cutter spindles from cutter collapsed position into said recesses, cutter spindles disposed in said cavities for longitudinal movement with the lower ends bearing against said bearing surfaces, the upper ends of said spindles having inclined surfaces corresponding to said guide surfaces and engaged therewith, said spindles being hinged intermediate the ends, said body having expander means at the hinged joints of said spindles including an inclined surface upon which the joints ride whereby to cause outward buckling of said spindles, actuating means tending to compress and move said spindles longitudinally and buckle the latter, and roller cutters mounted on said spindles.

13. An underreamer of the character described comprising a body having cutter accommodating cavities with lateral cutter bearing surfaces at the lower ends for cutter spindles, cutter supporting recesses in the upper ends of said cavities for receiving and laterally maintaining the upper cutter spindle ends in expanded position, inclined guide surfaces for directing the cutter spindles from cutter collapsed position into said recesses, cutter spindles disposed in said cavities for longitudinal movement with the lower ends bearing against said bearing surfaces, the upper ends of said spindles having inclined surfaces corresponding to said guide surfaces and engaged therewith, said cutter spindles being hinged intermediate the ends, said body having expander means at the hinged joints of said spindles including an inclined surface upon which the joints ride whereby to cause outward buckling of said spindles, an actuating sleeve having an upstanding marginal abutment forming a pocket to receive the lower ends of said spindles and maintain the latter against lateral displacement, said sleeve being mounted for longitudinal sliding movement on said body, a compression spring embracing said body and bearing against sleeve tending to compress and move said spindle longitudinally and buckle the latter, and roller cutters mounted on said spindles.

14. An underreamer of the character described comprising a body, cutter devices mounted on said body, extending longitudinally thereof, and being articulated intermediate their ends so as to be capable of being buckled outwardly into cutter expanding position and inwardly into cutter collapsed position, the ends of said devices being retained on the body against lateral displacement therefrom, the cutter devices being longitudinally movable with relation to the body, and a cutter expanding and supporting means on the body between the cutters at their articulations, with reference to which expanding means the cutters move longitudinally, means to cause such longitudinal movement, and the cutter devices and the expanding means being so formed that such longitudinal movement in one direction causes cutter expansion at the articulations.

15. An underreamer of the character described comprising a body, cutter devices mounted on said body, extending longitudinally thereof, and being articulated intermediate their ends so as to be capable of being buckled outwardly into cutter expanding position and inwardly into cutter collapsed position, the ends of said devices being retained on the body against lateral displacement therefrom, the cutter devices being longitudinally movable with relation to the body, and a cutter expanding and supporting means on the body between the cutters at their articulations, with reference to which expanding means the cutters move longitudinally, means to cause such longitudinal movement, said moving means being applied to one end of the cutter devices and tending also by endwise pressure to buckle the cutter devices outwardly, and the cutter devices and the expanding means being so formed that such longitudinal movement in one direction causes cutter expansion at the articulations.

In witness that I claim the foregoing I have hereunto subscribed my name this 14th day of March, 1928.

ROLAND R. CRUM.